(12) United States Patent
Gross

(10) Patent No.: US 11,383,866 B2
(45) Date of Patent: Jul. 12, 2022

(54) STORAGE CONTAINER FOR A STORAGE AND DISPENSING STATION

(71) Applicant: Becton Dickinson Rowa Germany GmbH, Kelberg (DE)

(72) Inventor: Dietmar Gross, Kelberg (DE)

(73) Assignee: BECTON DICKINSON ROWA GERMANY GMBH, Kelberg (DE)

( * ) Notice: Subject to any disclaimer, the term of this patent is extended or adjusted under 35 U.S.C. 154(b) by 86 days.

(21) Appl. No.: 16/604,025

(22) PCT Filed: Feb. 15, 2018

(86) PCT No.: PCT/EP2018/053747
§ 371 (c)(1),
(2) Date: Oct. 9, 2019

(87) PCT Pub. No.: WO2018/188837
PCT Pub. Date: Oct. 18, 2018

(65) Prior Publication Data
US 2020/0031509 A1    Jan. 30, 2020

(30) Foreign Application Priority Data
Apr. 11, 2017  (EP) .................................. 17166081

(51) Int. Cl.
*B65B 35/04*    (2006.01)
*B65D 83/04*    (2006.01)
*A61J 1/03*     (2006.01)

(52) U.S. Cl.
CPC .......... *B65B 35/04* (2013.01); *B65D 83/0409* (2013.01); *A61J 1/035* (2013.01)

(58) Field of Classification Search
CPC .. A61J 1/03; A61J 1/035; B65B 35/04; B65D 83/0409; G07F 11/54
See application file for complete search history.

(56) References Cited

U.S. PATENT DOCUMENTS 3,128,011 A * 4/1964 Bleiman ................. G07F 11/44
                                                      221/68
6,394,308 B1   5/2002 Yuyama et al.
(Continued)

FOREIGN PATENT DOCUMENTS

CN    102245151 A    11/2011
CN    202046589 U    11/2011
(Continued)

OTHER PUBLICATIONS

International Preliminary Report on Patentability for Application No. PCT/EP2018/053747, dated Oct. 15, 2019, 7 pages.
(Continued)

*Primary Examiner* — Gene O Crawford
*Assistant Examiner* — Kelvin L Randall, Jr.
(74) *Attorney, Agent, or Firm* — Morgan, Lewis & Bockius LLP

(57) ABSTRACT

A storage container for a storage and dispensing station for drugs is provided. The storage container includes a housing surrounding a holding space, which housing has a guide section and a bottom surface, the guide section defining a guide space and having a vertical guide recess, which does not penetrate the housing, and the bottom surface having a dispensing opening. The storage container includes a separating device having at least one channel for holding at least one drug portion and comprises a retaining element having a retaining section and having a guide element, which is arranged in the guide recess, the vertical guide recess and the guide element interacting in such a way that the retaining element is arranged for height adjustment in the guide recess by means of the guide element and rotational motion of the retaining means is prevented.

12 Claims, 4 Drawing Sheets

(56) References Cited

U.S. PATENT DOCUMENTS

| | | | |
|---|---|---|---|
| 9,457,950 B2* | 10/2016 | Yoshinori | G07F 11/44 |
| 9,663,260 B2* | 5/2017 | Morita | B65B 35/08 |
| 10,409,959 B2* | 9/2019 | Takahama | G16H 20/10 |
| 10,453,293 B2* | 10/2019 | Schmidt-Ellinger | G07F 11/44 |
| 10,583,979 B2* | 3/2020 | Schmidt-Ellinger | A61J 7/0084 |
| 10,672,219 B2* | 6/2020 | Schmidt-Ellinger | B65B 35/08 |
| 2004/0195261 A1* | 10/2004 | Hashimoto | B65B 9/08 221/258 |
| 2006/0037125 A1* | 2/2006 | McDowell | G02B 7/002 2/209.13 |
| 2007/0150092 A1 | 6/2007 | Ohmura et al. | |
| 2012/0003928 A1 | 1/2012 | Geboers et al. | |
| 2012/0006700 A1 | 1/2012 | Geboers et al. | |
| 2013/0233894 A1* | 9/2013 | Kim | G07F 17/0092 222/370 |
| 2014/0183208 A1* | 7/2014 | Bae | G07F 17/0092 221/91 |
| 2015/0090733 A1 | 4/2015 | Park | |
| 2016/0213572 A1* | 7/2016 | Tahahama | A61J 7/0076 |
| 2016/0371916 A1* | 12/2016 | Omura | G07F 11/44 |
| 2017/0101255 A1* | 4/2017 | Schmidt-Ellinger | A61J 7/0076 |
| 2020/0165058 A1* | 5/2020 | Schmidt-Ellinger | B65D 83/0409 |

FOREIGN PATENT DOCUMENTS

| | | |
|---|---|---|
| CN | 103910143 A | 7/2014 |
| EP | 2345399 A1 | 7/2011 |
| EP | 2572995 A1 | 3/2013 |
| EP | 2664316 A1 | 11/2013 |
| EP | 2752181 A2 | 7/2014 |
| EP | 2804156 A1 | 11/2014 |
| EP | 2962956 A1 | 1/2016 |
| JP | 2000203502 A | 7/2000 |
| JP | 2002153541 A | 5/2002 |
| JP | 2002272812 A | 9/2002 |
| WO | WO-2015068973 A1 | 5/2015 |

OTHER PUBLICATIONS

International Search Report for Application No. PCT/EP2018/053747, dated Mar. 29, 2018, 2 pages.
European Office Action for Application No. 18706983.6, dated Dec. 16, 2020, 11 pages including machine translation.
Chinese Office Action for Application No. 201880024096.1, dated Mar. 3, 2021, 15 pages including partial machine translation.

* cited by examiner

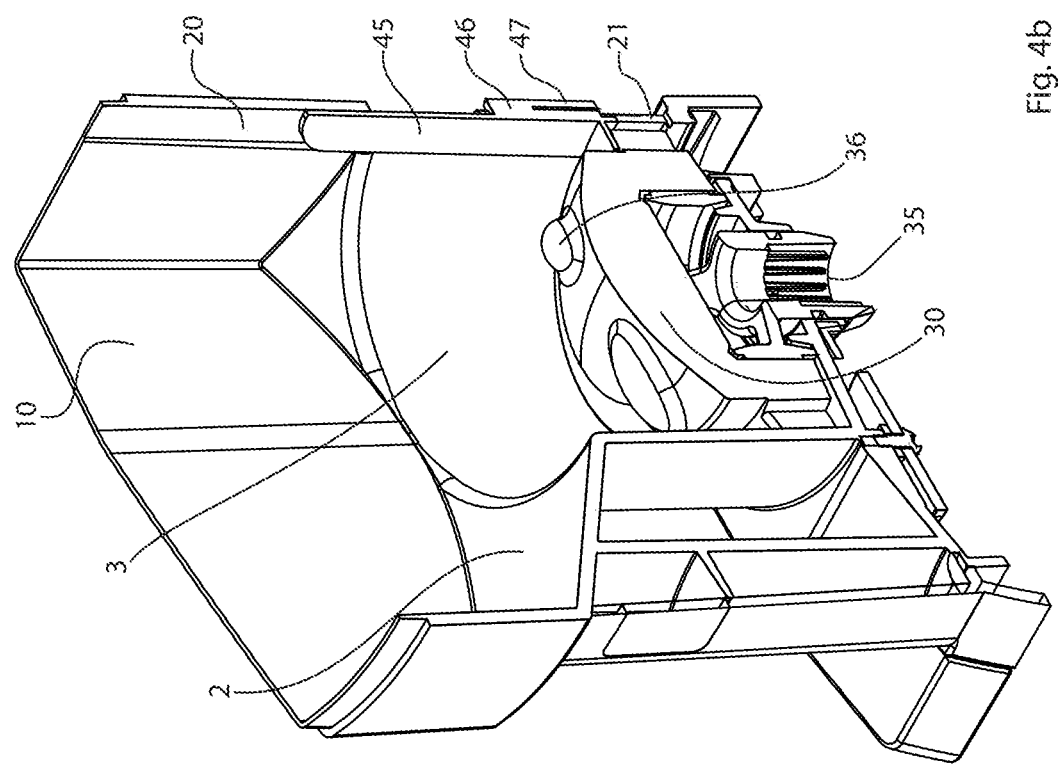
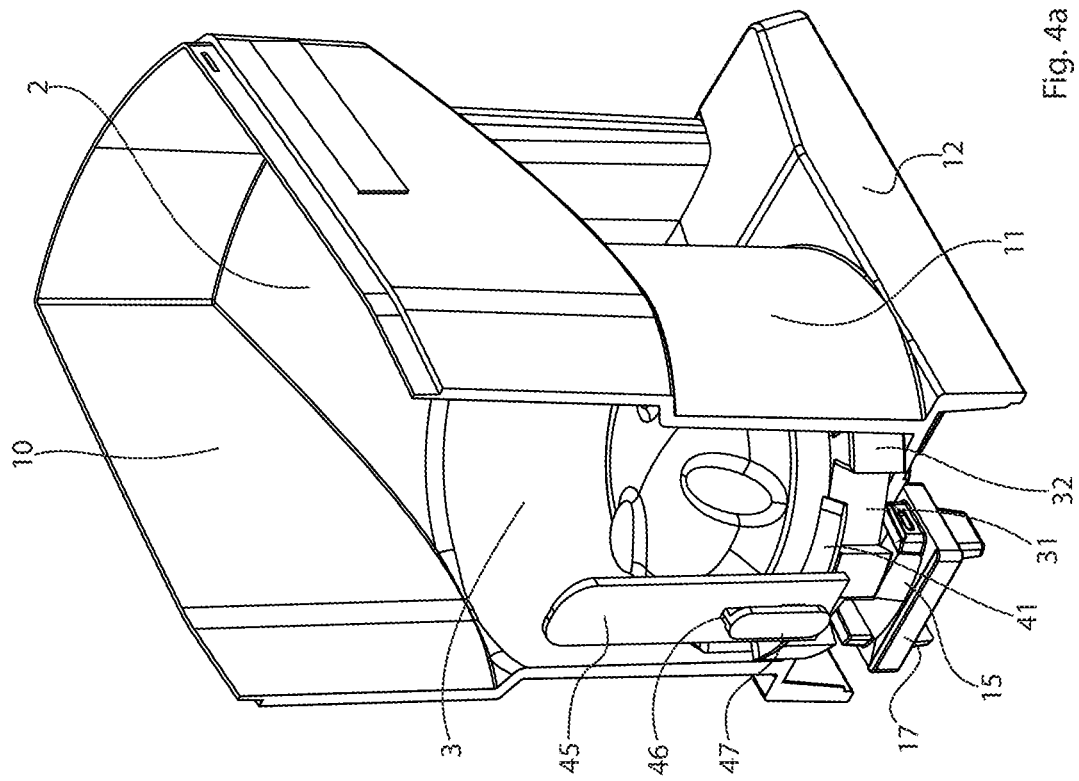

STORAGE CONTAINER FOR A STORAGE AND DISPENSING STATION

CROSS-REFERENCE TO RELATED APPLICATIONS

This application is a U.S. National Phase of International Application No. PCT/EP2018/053747, filed on Feb. 15, 2018, which claims the benefit of EP17166081.4, filed on Apr. 11, 2017, the entire contents of which are incorporated by reference herein.

The present invention relates to a storage container for a storage and dispensing station for piece goods, in particular drugs.

Depending on the expansion stage, modern blister packaging machines, as disclosed, for example, in WO 2013/034504 A1, comprise several hundred storage and dispensing stations. In each of these, a plurality of drug portions of a particular drug are stored, and individual drug portions can be dispensed on demand. With the blister packaging machine, the drugs stored in the storage and dispensing stations are assembled and blister-packed patient-specifically according to the medically prescribed administration times.

For the assembly of the drug portions, corresponding storage and dispensing stations are actuated for dispensing one or more individual drug portions. When actuating a storage and dispensing station, a single drug portion is separated with a singulator and transferred via a dispensing opening to a guide device of the blister machine. By means of the guide device, optionally with the interposition of a collecting device, a dispensed drug portion is fed to a packaging device which blister-packs individual or multiple drug portions according to the medical prescription.

For separating the drug portions which are stored in a storage container of a storage and dispensing station, the separating device comprises a rotor with a plurality of channels which are usually arranged on the outer circumference of the rotor. The channels are adapted to the respective drug portions to be separated with regard to their dimensions such that in a channel the drug portions can only be arranged one above the other, but not adjacent to each other. The channels may also be dimensioned such that only one drug portion can be received in a channel.

For dispensing a drug portion from a channel, a channel is moved above a dispensing opening in the housing of the storage container, and the drug portion arranged at the lowest point in the channel slides or falls into the dispensing opening. In order to prevent further drug portions stored in or above the channel from also being dispensed, in the region above the dispensing opening a retaining section of a retaining means is guided or arranged at least in or over the channel which is aligned with the dispensing opening. This retaining section is arranged in relation to the height of the channel in or above the channel, in such a way that only one drug portion can be arranged under the retaining section. If the retaining section is guided into the channel to separate the lowermost drug portion from those arranged above it, projections separating individual channels have a slot which receives the retaining section. If the retaining section is arranged or guided over the channels, it is regularly guided only slightly over the upper ends of the projections, so that further drug portions are prevented from entering the channel when the drug portion is dispensed.

The retaining section of the retaining means in known supply and dispensing stations is guided from the outside through a horizontal housing slot into the storage container, in such a way that, depending on the design of the channels, the retaining section is arranged over these channels or in a slot in the channels. As already explained above, the channels and thus the projections defining the channels are adapted to the dimensions of the respective drug portions to be isolated. This means, inter alia, that the protrusions are at different heights for different drug portions. If a plurality of drug portions can be received in a channel, the position of the slot in which the retaining section of the retaining means engages is also dependent on the dimensions of the drug portions. This implies that the position of the horizontal slot in the housing is also dependent on the dimensions of the drug portions so that different housings are to be used for different drug portions. In other words, the same housing cannot be used with drug portions of different dimensions.

It is therefore an object of the present invention to provide a storage container for a storage and dispensing station which can be used for drug portions of different dimensions.

The object is achieved by a storage container according to claim 1. The storage container for a storage and dispensing station for drugs according to the invention comprises a housing enclosing a holding space for drug portions with a guide section and a bottom surface, wherein the guide section defines a usually circular cylindrical guide space and has a vertical guide recess which does not penetrate the housing, and wherein the bottom surface has a dispensing opening. The storage container further comprises a separating device arranged in the guide section of the housing with at least one channel for receiving at least one drug portion and a retaining means with a retaining section, wherein the retaining section is arranged completely within the guide section and is held above the dispensing opening and prevents an entry of further drug portions into a channel aligned with the dispensing opening. Whether the retaining section of the retaining means is held or guided over the at least one channel or in a slot of projections which define the channels, is dependent on the exact design of the channels and has no effect on the invention as such.

The retaining means further comprises a guide means, wherein the guide means is arranged in the vertical guide recess, and wherein the vertical guide recess and the guide means cooperate such that the retaining means is arranged or supported vertically adjustably in the guide recess and at the same time a rotational movement or a circular movement of the retaining means is prevented.

Thus, while it is provided in known storage containers that the retaining section is inserted through a housing slot and thus the position of the housing slot is dependent on the dimensions of the drug portions, it is provided according to the invention that the retaining means is adjustable in height within the storage container, for which purpose a vertical guide recess is provided in the guide section, wherein the guide recess cooperates with a corresponding guide means of the retaining section to ensure the necessary height adjustability. The vertical guide recess and the guide means are designed so that a radial offset and a circumferential movement or circular movement of the guide means within the guide section or guide space is avoided. It is essential that this movement is prevented because the retaining section of the retaining means must always be aligned with or arranged in the channel which is aligned with the dispensing opening in the bottom surface.

In the storage container according to the invention, no slot is provided in the housing. This has the further advantage that no drug dust or abraded material forming in the storage and dispensing station can escape to the outside. This is particularly important in the light of the fact that modern blister packaging machines are occasionally used in ultra-clean rooms in which a leakage of drug dust causes an increased need for cleaning.

The exact design of the guide recess and the guide means is not essential to the invention, as long as it is ensured that the retaining means is adjustable in height over the combination of guide recess/guide means on the one hand, and on the other hand is not movable radially and circumferentially or in a circular manner.

In a structurally particularly simple embodiment, it is preferred that the guide means and the guide recess are coupled by means of a dovetail connection. Alternatively, it can be provided that the guide means and the guide recess are coupled via magnetic holding means. When the retaining portion is held in a slot in the projections of the separating device, it may also be sufficient if the side surfaces of the guide recess are formed perpendicularly to each other in parallel.

According to the invention the guide means is arranged so as to be adjustable in height in the guide recess. As a result of gravity, the retaining section either rests on the separating device or is held in a horizontal slot which divides the projections. In other words, although the guide means is adjustable in height in the guide section, it is not necessarily arranged so that it can be fixed in height. In order to also enable a height fixability, it may be provided in a preferred embodiment that the guide recess and the guide means have locking means which allow such a height fixability.

According to the invention, the guide means is arranged in the guide recess, which in turn is formed in the guide section. The guide section defines the usually circular cylindrical guide space. Due to the design, it is thus the case that the guide recess "interrupts" the otherwise circular cylindrical guide space. In order to prevent this interruption from damaging drug portions or to prevent dust from accumulating therein, it is provided in a preferred embodiment that the surface of the guide means facing the guide space has a circular cylindrical contour.

According to the invention, the guide recess does not penetrate the housing or the guide section. In order to prevent the housing from having, in the entire region of the guide section, a wall thickness which allows the formation of a recess, it is provided in a preferred embodiment that the housing has, (only) in the region of the guide section, a projection (i.e., a housing wall reinforcement) in which the guide recess is arranged.

As already indicated, the dimensions of the medicament portions to be isolated determine the configuration of the channels or projections, this configuration in turn necessitating the arrangement of the retaining means, i.e. the "height" or position in the circular cylindrical section of the housing. In order to be able to influence the "height" of the retaining means also from outside, it is provided in a preferred embodiment that the retaining means comprises an operating element coupled to the guide means and arranged outside the guide section. The coupling between the guide means and the operating element is arbitrary. For example, it can be provided that both in the guide means and in the operating element, a magnet is arranged, by means of which the coupling takes place.

As stated above, it is a further advantage of the storage container according to the invention that due to the non-existing housing slot, no dust can escape to the outside. If, due to the installation location or the nature of the drug portions to be isolated, this is less relevant or not relevant, it may be provided in one embodiment with regard to the coupling between the retaining means and the operating element that the guide recess has a vertical guide slot and the guide means comprises a guide projection extending through the guide slot and coupled to the operating element, wherein the guide means completely covers the guide slot.

The embodiment of the storage container with the operating element makes it possible to adjust the height of the retaining means from outside the guide section. In the event that the retaining section of the retaining means is guided in a slot of the projections of the separating device, the set height is fixed by this slot as such, that is the retaining section, and thus the retaining means, do not move up or down due to the arrangement in the slot or slots. Even if the retaining section rests on top of the projections or the openings of the channels, due to the dead weight of the retaining means as well as the drug portions pressing from above onto the retaining section, it is unlikely that the retaining means will move upward. However, if the retaining means is not fixed in height, it rests with its retaining section either on top of the projections or in the slot. To avoid this, it is provided in a preferred embodiment that the operating element and the guide section comprise holding means, via which the retaining means in the guide space can be fixed in height. To this end the holding means are designed so that they interlock and cause the height fixation by the interlocking. For example, the holding means may be formed as a locking means.

A storage container will usually be loaded over time with a plurality of different types of drugs, which regularly have different dimensions and therefore require the use of different separating devices. In order to remove a separating device from a storage container, it is necessary to remove the retaining means from the storage container. If the retaining means is designed such that a component, such as the operating element, is guided to the outside, it is provided in a preferred embodiment that the storage container comprises an opening adapted to the operating element. During removal of the retaining means, this is adjusted in height so that the operating element disposed outside can be pushed inwards through this opening, so that the retaining means can be removed inwards. In order to prevent dust particles from escaping through this opening, the opening is preferably arranged and formed in the circular cylindrical section or the housing such that the opening is concealed by the guide means in an operating state.

In one embodiment of the storage container, in which a vertical guide slot is provided in the circular cylindrical section of the housing, to further avoid escape of drug dust it is preferable that elastic closing means are associated with the vertical guide slot, which make it difficult for dust particles to escape from the storage container, but at the same time allow movement of the guide projection in the guide slot. For example, the guide means may be formed as a kind of elastic comb which covers the guide slot at the locations where the guide means does not penetrate the guide slot.

Hereinafter, preferred embodiments of the storage container according to the invention for storage and dispensing stations will be described with reference to the accompanying drawings, in which FIGS. 1a-1d show various views of a first preferred embodiment of the storage container according to the invention;

FIGS. 4a, 4b show sectional views of a third embodiment of the storage container;

Figure 1B:
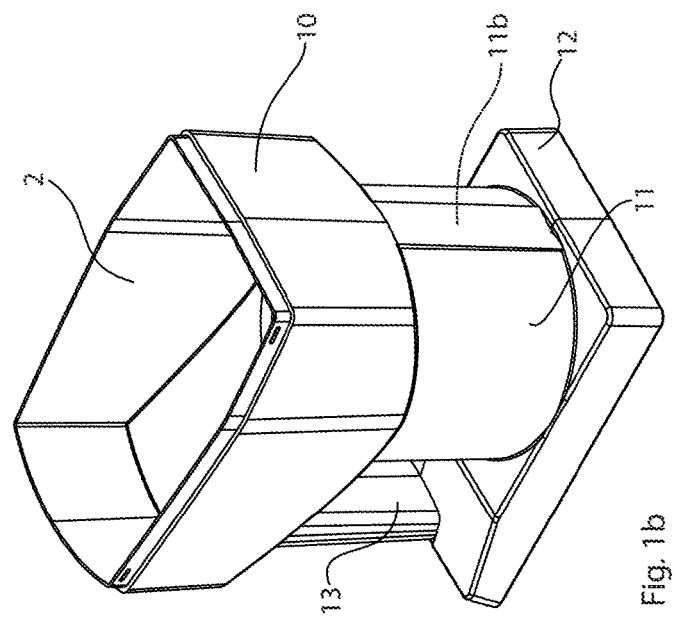
Figure 1D:
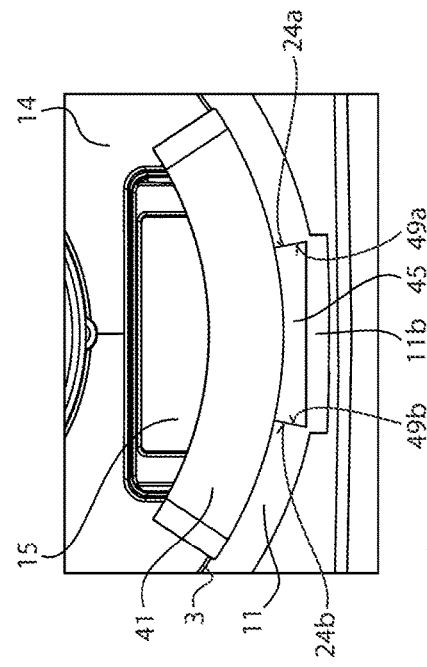
Figure 1A:
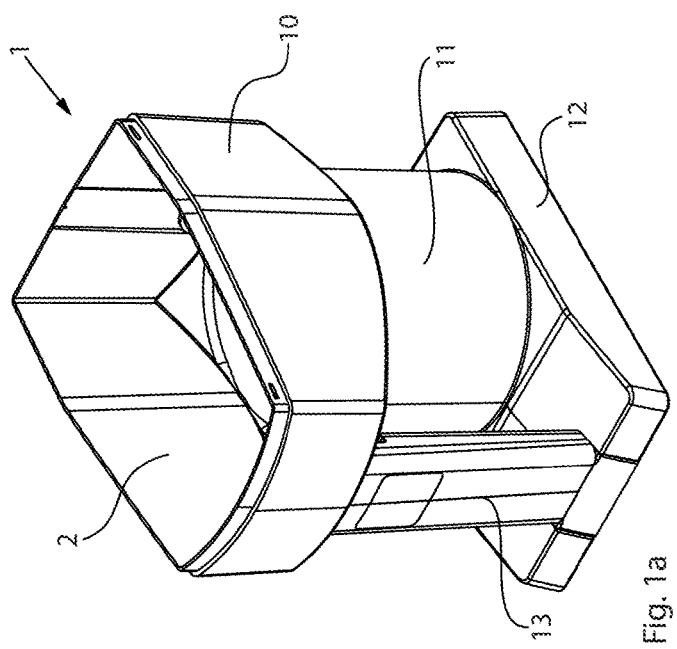
Figure 1C:
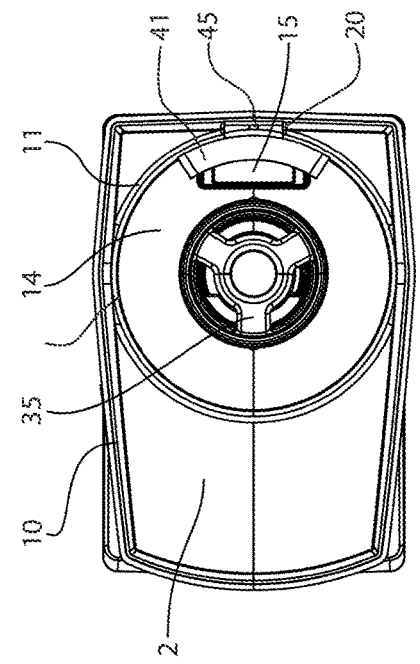

FIGS. 1a and 1b show two oblique views of a first preferred embodiment of the storage container 1 for a storage and dispensing station for drugs. FIG. 1c shows a top view of the storage container, and FIG. 1d shows a detail view of FIG. 1c. In all representations of the storage container, a cover which is provided in the usual operation of a storage container is omitted for a better view. The storage container according to the invention shown in FIGS. 1a-1c is part of a storage and dispensing station for drugs, wherein, as the name already makes clear, the drug portions to be separated are stored in the storage container. The storage container 1 further comprises a separating device, which is part of a separating mechanism extending over the storage container and a dispensing part, and which is described in more detail with reference to the following figures. The dispensing part can comprise, for example, a controller and a drive for the separating device.

The storage container itself comprises a housing 10 enclosing a holding space 2 for drug portions (not shown), which housing comprises a guide section 11 in the middle region and a foot section 12 underneath. The guide section defines a largely circular cylindrical guide space, in which, as described below, the separating device is arranged. The guide space is said to be "largely" circular because, as will also be described in more detail below, in the guide portion a guide recess is provided which interrupts a complete circular cylinder in the interior of the guide section. The housing of the storage container further comprises a handle 13, with which the storage container 1 can be easily removed from the dispensing part of the storage and dispensing station.

As can be seen in FIG. 1c, the guide space 3 or the guide section 11 of the housing is closed at the bottom by a bottom surface 14 which comprises a dispensing opening 15 and a central opening, wherein in FIG. 1c a coupling means 35 of the separating device 30 arranged in the guide space 3 (see FIG. 2a) is shown.

In FIG. 1c, a retaining means is arranged in the right region of the guide section 11 of the housing, and the retaining section 41 thereof is aligned with the bottom opening 15. The retaining section closes a channel aligned with the dispensing opening 15, so that no further drug portions can penetrate into the channel aligned with the dispensing opening 15 (see also FIGS. 4a, 4b). The retaining means is mounted via a guide means 45 in a guide recess 20 in the guide section 11, wherein the design of the guide recess 20 and the guide means 45 ensures that the guide means is not radially offset upon rotation of the separating device, in other words it does not move with the separating device in the circumferential direction, but is always aligned with the dispensing opening.

FIG. 1d shows in detail the exact configuration of the guide section 11 in the region of the guide recess 20 and of the guide means 45. The two aforementioned components are coupled to each other via a dovetail connection, which ensures that the guide means 45 is not displaceable radially and circumferentially, but in terms of height (i.e., axially) it is movable (i.e., a radially and circumferentially positive connection exists). To form the dovetail connection, side walls 24a, 24b defining the guide recess 20 and side walls 49a, 49b delimiting the guide means are correspondingly conical and converge inwards.

Figure 2A:
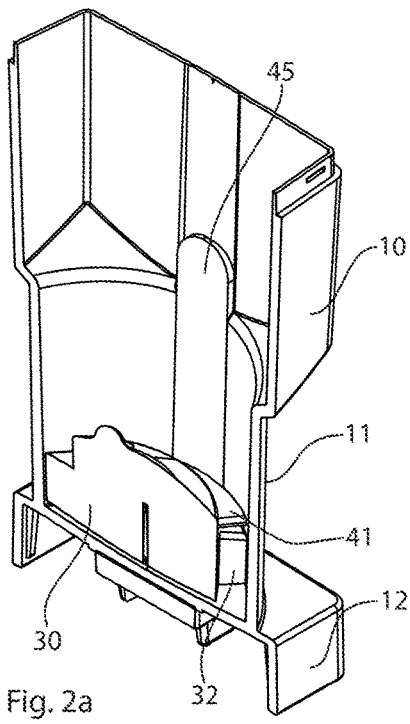
FIGS. 2a-2c show various sectional views of the first embodiment of the storage container.
Figure 2B:
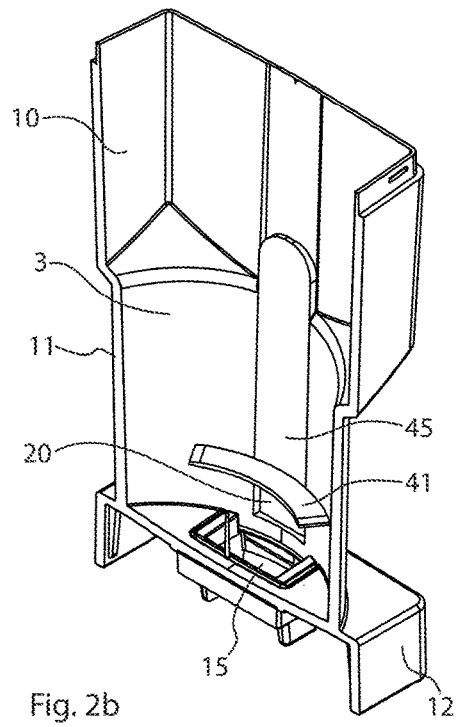
Figure 2C:
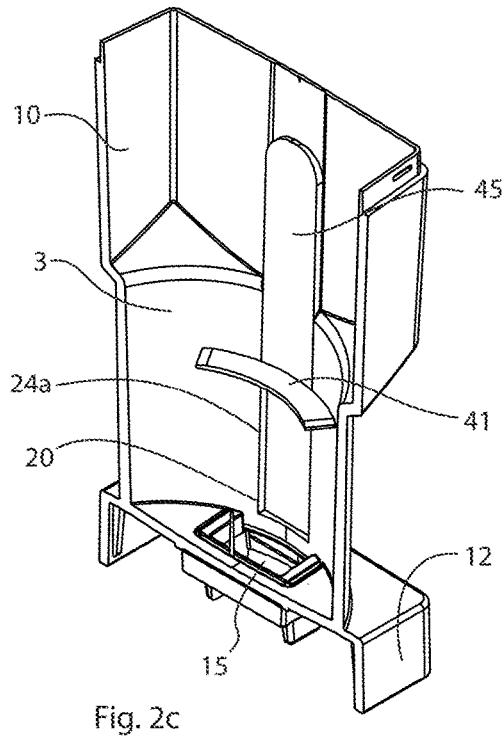

FIGS. 2a-2c show various sectional views of the first embodiment of the storage container according to the invention. In FIG. 2a, it can be seen that the retaining section 41 of the retaining means is held above the projections 32 of the separating device 30. In FIGS. 2a-2c, the vertical guide recess 20 in the guide section 11 of the storage container can be seen. In the embodiment shown, the guide means 45 is held in the guide recess via a dovetail connection. The guide recess 20 itself does not penetrate the wall of the guide section 11, so escape of drug dust is thus avoided, in contrast to storage containers according to the prior art.

Figure 3:
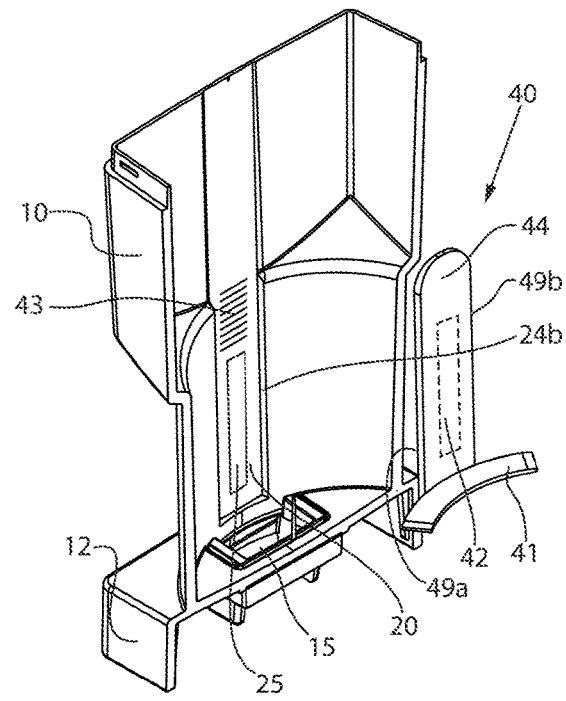
FIG. 3 shows a sectional view of a second preferred embodiment.
Figure 6:
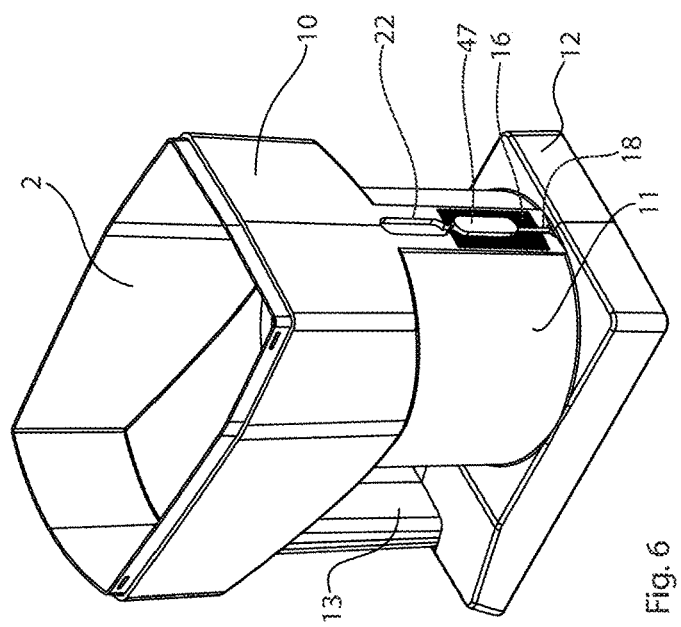
FIG. 6 shows a side view of the third embodiment.

FIG. 3 shows a sectional view of a second preferred embodiment. In this second embodiment, the guide means is not only adjustable in height, but also fixable in height. The height fixability is achieved via locking means 43, which are arranged on the rear wall of the guide projection 20 and cooperate with corresponding locking means (not shown) on or in the side of the guide means facing the rear wall. The height fixability can be further achieved by magnetically acting holding means 25, 42, which are arranged in the rear wall and the guide means 45. These can also be used for a coupling of the guide means in the guide projection. The magnetic holding means can thus be used for fixation in the axial, radial and circumferential direction. The two aforementioned configurations of the axial fixation are shown for purely descriptive technical reasons in a drawing or an embodiment, and, purely practically, these two types of fixation are usually probably used alternatively.

Figure 5:
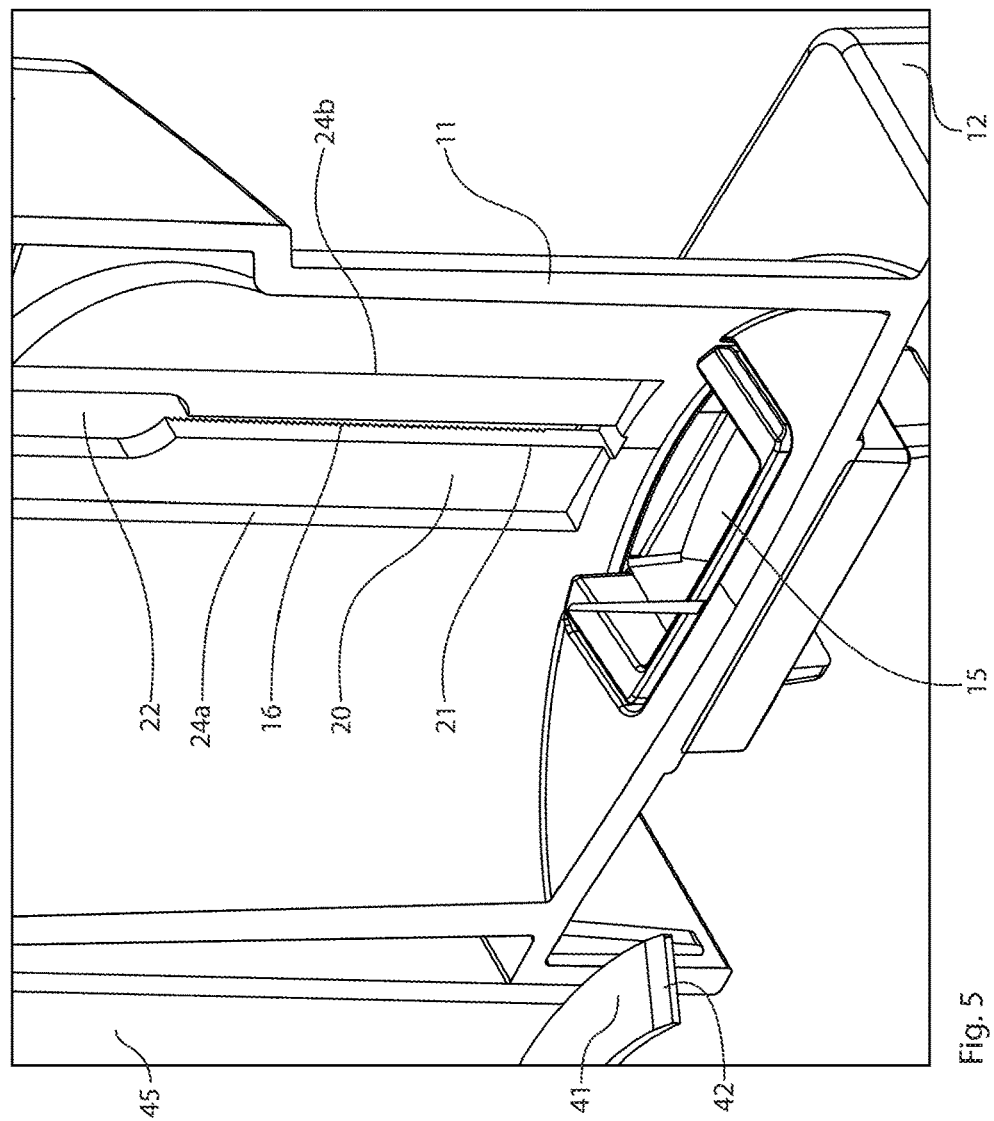
FIG. 5 shows a detail view of the guide recess of the third embodiment.

FIGS. 4a, 4b and 5 show a third embodiment of the storage container according to the invention, in which the guide recess 20 has a vertical guide slot 21 through which a guide projection 46 which is formed on the guide means 45 extends. As can be seen in FIGS. 4a and 4b, the separating device 30 is designed in the shape of a rotor and comprises a plurality of channels 31 for receiving at least one drug portion. The channels 31 are formed by a plurality of projections 32, the outer periphery of which rests against the inner wall of the guide section 11. The separating device 30 has a conical surface, wherein the conicity ensures that no drug portions remain in, for example, the center of the surface of the separating device. In the illustrated embodiment, the conical surface of the singulator also includes a plurality of protrusions 36 that direct drug portions toward the outer periphery and thus toward the channels 31.

Furthermore, in the embodiment shown, as can be seen in particular in FIG. 5, in the guide recess 20 an opening 22 is formed through which an operating element 47 can be guided during installation of the retaining means. By means of the aforementioned operating element and the guide projection 46, the retaining means 40 is secured in the guide recess parallel to the axis of rotation of the separating device.

In FIGS. 4a, 4b, the alignment of the retaining means with respect to the separating device 30 and the dispensing opening 15 and the retaining means themselves are shown in detail. In FIG. 4a, a part of the housing 10 and of the guide section 11 is omitted and it can be seen that the retaining means 40, or the retaining section 41 thereof, is arranged over the dispensing opening 15 of the bottom surface, so that when a channel 31 is aligned with the dispensing opening only the drug portion(s) which is (are) arranged in the channel below the retaining section is (are) dispensed.

In FIGS. 4a and 4b, the more detailed construction of the retaining means according to the third embodiment can be seen. This comprises a guide means 45, which is arranged in the vertical guide recess which is only partially visible in FIG. 4b. The guide projection 46, which extends through the guide slot 21, extends outwards in the lower section of the guide means 45. The operating element 47, which is wider than the guide slot 21 and fixes the guide means 45 fixed radially and circumferentially or in a circular manner, is arranged on the guide projection 46.

Thus, in the embodiment shown, the operating element 47 also ensures a fixation of the retaining means, by "clamping" of a section of the guide section between the operating element 47 and the guide means 45. A corresponding fixation may alternatively or additionally take place by means of suitable configurations of the guide recess and of the guide means, for example by using a type of dovetail connection, as described in the first embodiment.

It can also be seen in FIG. 4*b* that the separating device 30 comprises a coupling means 35, by means of which the separating device 30 can be coupled to a drive. In alternative embodiments, it is also conceivable that the storage container itself comprises a drive for rotating the separating device.

FIG. 5 shows a detail view of the guide recess, wherein the retaining means is displaced towards the axis of rotation. The retaining section 41 of the retaining means has flattened ends 42 so that drug portions arranged in the holding space can be gently grasped from below. The guide recess 20 is arranged on the dispensing opening 15 in the bottom surface and has a rectangular shape in the embodiment shown. As already described with reference to the preceding figures, in the center the guide recess comprises a guide slot 21 which extends through the guide section 11. In the upper section of the guide recess 20, a part of the opening 22 can also be seen, through which an operating element can be guided, which facilitates the installation of the retaining means in the storage container itself. In FIG. 5, holding means 16 are indicated, via which the retaining means can be fixed coaxially at a certain "height" (with respect to the guide recess or the separating device). In the embodiment shown, the holding means 16 are designed as locking means.

The invention claimed is:

1. A storage container for a storage and dispensing station for drugs, comprising:
   a housing enclosing a holding space for drug portions with a guide section and a bottom surface, the bottom surface having a dispensing opening, wherein the guide section has an outer wall that defines a guide space and has a single central vertical guide recess disposed within the outer wall and which does not penetrate through outside of the outer wall, wherein recess side walls defining the single central vertical guide recess extend into the outer wall from an inner surface of the outer wall, and wherein the single central vertical guide recess is centrally aligned with the dispensing opening;
   a separating device arranged in the guide space of the housing and having at least one channel for receiving at least one drug portion; and
   a retaining means comprising:
      a retaining section, wherein the retaining section is arranged completely within the guide space and is held above the dispensing opening and prevents an entry of further drug portions into a channel aligned with the dispensing opening, and
      a guide means, wherein the guide means is movably arranged within the single central vertical guide recess and guide side walls of the guide means extend inward from the inner surface of the outer wall, wherein the retaining section is arranged outside of the single central vertical guide recess and vertically adjustably above the dispensing opening, and wherein radial movement of the retaining means upon rotation of the separating device is prevented,
   wherein the single central vertical guide recess has a vertical guide slot disposed further within the outer wall and the guide means comprises a guide projection extending through the vertical guide slot and coupled to an operating element arranged outside the guide section, wherein the guide means completely covers the vertical guide slot,
   and wherein associated with the vertical guide slot are elastic closing means which make it difficult for material to escape from the storage container but allow movement of the guide projection in the vertical guide slot.

2. The storage container of claim 1, wherein the guide means and the single central vertical guide recess are coupled by means of a dovetail connection.

3. The storage container of claim 1, wherein the guide means and the single central vertical guide recess are coupled via magnetically acting holding means.

4. The storage container of claim 1, wherein the single central vertical guide recess and the guide means have locking means.

5. The storage container of claim 1, wherein the guide space is circular cylindrical and a surface of the guide means facing the guide space has a circular cylindrical contour.

6. The storage container of claim 1, wherein the housing has, in a region of the guide section, a projection in which the single central vertical guide recess is arranged.

7. The storage container of claim 1, wherein the operating element and the guide section comprise holding means via which the retaining means in the guide space can be fixed in height.

8. The storage container of claim 1, wherein the storage container comprises an opening adapted to the operating element, wherein the opening is preferably arranged and formed such that the opening is concealed by the guide means in operating state.

9. The storage container of claim 1, wherein the operating element is wider than the vertical guide slot.

10. The storage container of claim 1, wherein the operating element is arranged on the guide projection.

11. The storage container of claim 1, wherein the guide means is slidably moved within the single central vertical guide recess by external movement of the operating element.

12. The storage container of claim 1, wherein the guide means is slidably disposed completely within the single central vertical guide recess.

* * * * *